US012335135B2

(12) United States Patent
Rosa et al.

(10) Patent No.: US 12,335,135 B2
(45) Date of Patent: Jun. 17, 2025

(54) NETWORK-GRAPH FRAMEWORK AND OPTIMIZATION SYSTEM FOR CARGO ROUTES

(71) Applicant: XPO, Inc., Greenwich, CT (US)

(72) Inventors: Charles Rosa, Rochester Hills, MI (US); Tanmaya Mathur, Seattle, WA (US); Eric Chriscinske, Ann Arbor, MI (US)

(73) Assignee: XPO, Inc., Greenwich, CT (US)

( * ) Notice: Subject to any disclaimer, the term of this patent is extended or adjusted under 35 U.S.C. 154(b) by 0 days.

(21) Appl. No.: 18/376,242

(22) Filed: Oct. 3, 2023

(65) Prior Publication Data
US 2025/0112852 A1    Apr. 3, 2025

(51) Int. Cl.
*H04L 45/24* (2022.01)
*G06Q 10/0835* (2023.01)
*H04L 45/02* (2022.01)
*H04L 45/12* (2022.01)

(52) U.S. Cl.
CPC ....... *H04L 45/24* (2013.01); *G06Q 10/08355* (2013.01); *H04L 45/02* (2013.01); *H04L 45/123* (2013.01)

(58) Field of Classification Search
CPC .......... G06Q 10/0833; G06Q 10/08355; H04L 45/24; H04L 45/02; H04L 45/123

USPC .......................................................... 705/338
See application file for complete search history.

(56) References Cited

U.S. PATENT DOCUMENTS

| 2012/0050531 | A1* | 3/2012 | Wu | G08B 13/08 |
| 2014/0372335 | A1* | 12/2014 | Jones | G06Q 10/0833 |
| | | | | 705/333 |
| 2022/0196416 | A1* | 6/2022 | Suzuki | B60W 60/0053 |

OTHER PUBLICATIONS

"An Optimization Route Selection Method of Urban Oversize Cargo Transportation" Published by Applied Sciences (Year: 2021).*

* cited by examiner

*Primary Examiner* — Zeina Elchanti
(74) *Attorney, Agent, or Firm* — Kilpatrick Townsend & Stockton LLP

(57) ABSTRACT

Some examples of the present disclosure include a system that can receive a predetermined set of routes for moving cargo through a network. The system can construct a model based on the predetermined set of routes, where the model defines a combinatorial optimization problem that is solvable to identify an optimal set of routes from the predetermined set of routes. The system can then execute an iterative process using the model to solve the combinatorial optimization problem and thereby determine the optimal set of routes through the network. The system can provide, to a client device, instructions generated based on the optimal set of routes for use in facilitating transport of the cargo through the network in accordance with the optimal set of routes.

20 Claims, 11 Drawing Sheets

NETWORK-GRAPH FRAMEWORK AND OPTIMIZATION SYSTEM FOR CARGO ROUTES

TECHNICAL FIELD

The present application generally relates to network graphs and, more particularly, relates to a network-graph framework and optimization system for cargo routes.

BACKGROUND

Network graphs such as node-link diagrams can be used to show interrelationships and connections between objects. For example, a network graph can show the connections between hardware devices (e.g., routers, hubs, and compute nodes) of a computer network. Network graphs typically include nodes and links. The nodes may represent objects and the links may represent relationships between the objects.

SUMMARY

One example of the present disclosure includes a non-transitory computer-readable medium comprising program code that is executable by one or more processors to cause the one or more processors to perform operations. The operations can include receiving a predetermined set of routes for moving cargo through a network. The operations can include constructing a model based on the predetermined set of routes, wherein the model includes a predefined objective function and one or more constraints, and wherein the model defines a combinatorial optimization problem that is solvable to identify an optimal set of routes from the predetermined set of routes that most closely satisfies the predefined objective function subject to the one or more constraints. The operations can include executing an iterative process using the model to solve the combinatorial optimization problem and thereby determine the optimal set of routes through the network. Executing the iterative process includes: executing a first iteration of the model in which vias and diversions in the predetermined set of routes are ignored, to identify an initial set of routes from the predetermined set of routes that excludes the vias and the diversions; executing a second iteration of the model in which the vias are ignored and the diversions are allowed, and starting from the initial set of routes, to determine an intermediate set of routes that excludes the vias; and executing a third iteration of the model in which the vias are allowed, and starting from the intermediate set of routes, to determine the optimal set of routes. The operations can include providing, to a client device, instructions generated based on the optimal set of routes for use in facilitating transport of the cargo through the network in accordance with the optimal set of routes.

Another example of the present disclosure can include a system comprising one or more processors and one or more memories including program code that is executable by the one or more processors to cause the one or more processors to perform operations. The operations can include receiving a predetermined set of routes for moving cargo through a network. The operations can include constructing a model based on the predetermined set of routes, wherein the model includes a predefined objective function and one or more constraints, and wherein the model defines a combinatorial optimization problem that is solvable to identify an optimal set of routes from the predetermined set of routes that most closely satisfies the predefined objective function subject to the one or more constraints. The operations can include executing an iterative process using the model to solve the combinatorial optimization problem and thereby determine the optimal set of routes through the network. Executing the iterative process includes: executing a first iteration of the model in which vias and diversions in the predetermined set of routes are ignored, to identify an initial set of routes from the predetermined set of routes that excludes the vias and the diversions; executing a second iteration of the model in which the vias are ignored and the diversions are allowed, and starting from the initial set of routes, to determine an intermediate set of routes that excludes the vias; and executing a third iteration of the model in which the vias are allowed, and starting from the intermediate set of routes, to determine the optimal set of routes. The operations can include providing, to a client device, instructions generated based on the optimal set of routes for use in facilitating transport of the cargo through the network in accordance with the optimal set of routes.

Still another example of the present disclosure can include a method of operations performed by one or more processors. The operations can include receiving a predetermined set of routes for moving cargo through a network. The operations can include constructing a model based on the predetermined set of routes, wherein the model includes a predefined objective function and one or more constraints, and wherein the model defines a combinatorial optimization problem that is solvable to identify an optimal set of routes from the predetermined set of routes that most closely satisfies the predefined objective function subject to the one or more constraints. The operations can include executing an iterative process using the model to solve the combinatorial optimization problem and thereby determine the optimal set of routes through the network. Executing the iterative process includes: executing a first iteration of the model in which vias and diversions in the predetermined set of routes are ignored, to identify an initial set of routes from the predetermined set of routes that excludes the vias and the diversions; executing a second iteration of the model in which the vias are ignored and the diversions are allowed, and starting from the initial set of routes, to determine an intermediate set of routes that excludes the vias; and executing a third iteration of the model in which the vias are allowed, and starting from the intermediate set of routes, to determine the optimal set of routes. The operations can include providing, to a client device, instructions generated based on the optimal set of routes for use in facilitating transport of the cargo through the network in accordance with the optimal set of routes.

BRIEF DESCRIPTION OF THE DRAWINGS

The accompanying drawings, which are incorporated into and constitute a part of this specification, illustrate one or more certain examples and, together with the description of the examples, serve to explain the principles and implementations of the certain examples.

DETAILED DESCRIPTION

Figure 1:
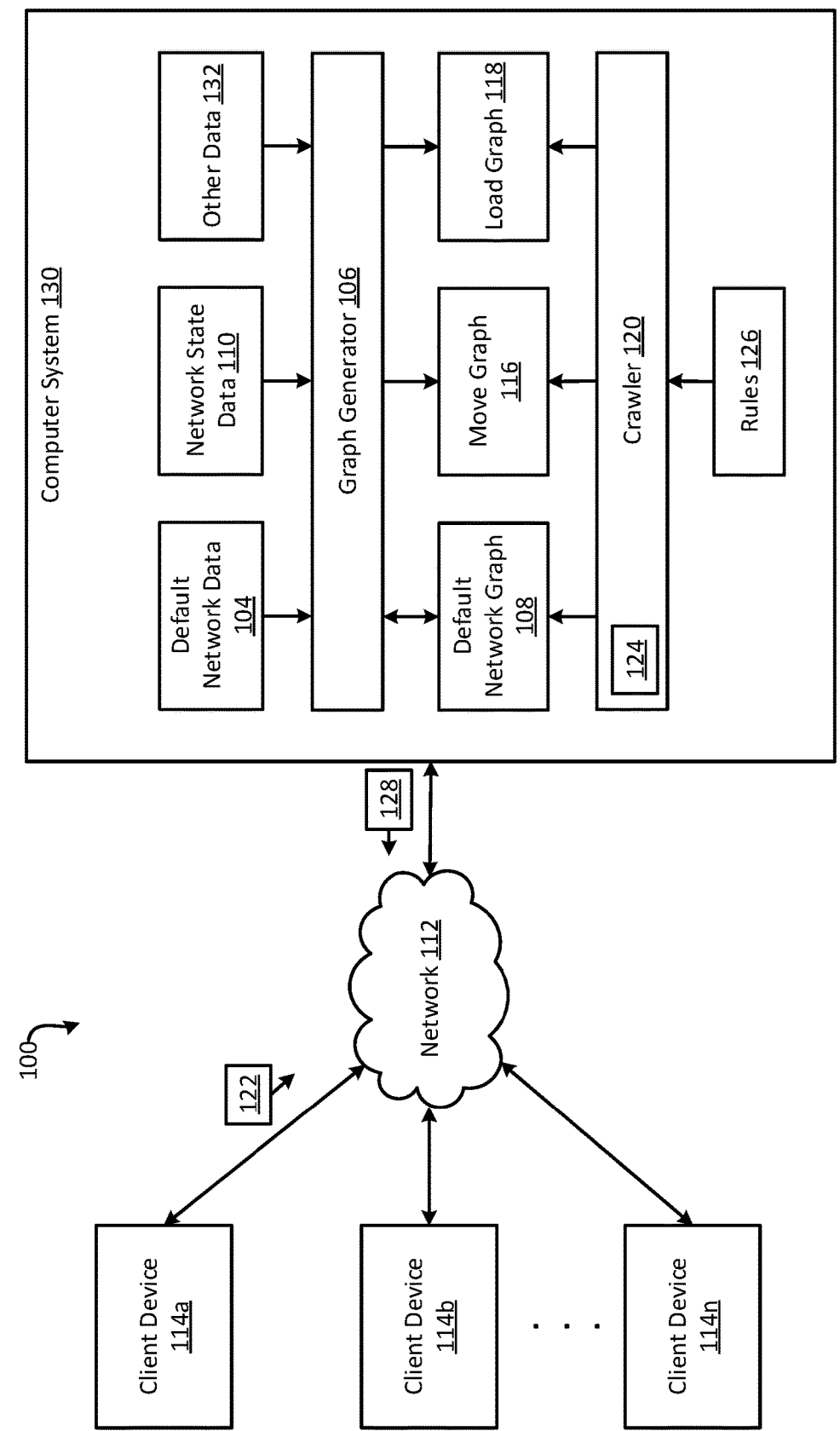
FIG. 1 shows a block diagram of an example of a system for implementing a network graph framework according to some aspects of the present disclosure.

Examples are described herein in the context of cargo routes. But the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific objectives, such as compliance with various constraints, and that these specific objectives will vary from one implementation to another and from one developer to another.

Network graphs are often used in a wide variety of industries to represent objects and their relationships. If the number of objects and relationships is small, a computer system can generate a network graph relatively quickly. But in certain contexts, the number of potential nodes and links may be so large that it is too slow to generate up-to-date network graphs, even using some of the fastest computer systems available. For example, in the context of cargo transport, a service provider may have a network of 300+ service centers, 50+ freight assembly centers, 10,000+ trucks, and other infrastructure. Attempting to construct a network graph that indicates all of the possible routes in which cargo (e.g., freight) can be transported through the network is a computationally intensive and slow task. For example, it may take days or longer to generate such a network graph using powerful servers, which may consume a significant amount of processing power and memory in the process.

Additionally, some networks are more dynamic than others. For example, the physical infrastructure of a computing cluster may be relatively fixed and thus may change very little over time. In contrast, a carrier network for transporting cargo can have many objects (e.g., trucks, drivers, trailers, and cargo) that move locations throughout a given day, which impacts the route options. For instance, a cargo route that is viable at time $t_1$ may be infeasible at time $t_2$ because the truck locations and cargo have changed. Because the carrier network's state is continuously changing, a network graph may become quickly outdated and need to be recomputed. But because of how long it can take to compute such network graphs, by the time the network graph is recomputed from scratch, it is outdated again.

Some examples of the present disclosure can overcome one or more of the abovementioned problems by providing a network graph framework and optimization system for rapidly generating up-to-date network graphs of routes for transporting cargo through a carrier network. For example, a computer system can generate a default network graph based on a set of default network data. The default network graph can include a default set of routes for cargo through the carrier network. After generating the default network graph, the computer system can obtain network state data indicating a current state of the network, such as the locations of moving objects like cargo, trucks, trailers, and drivers in the network. The computer system can obtain the network state data from one or more data sources, such as other computer systems located at service centers and assembly centers throughout the country or the world. Based on the default network graph and the network state data, the computer system can automatically generate a move graph and a load graph. The move graph can indicate move routes. A move route can include a sequence of move legs. A move leg can include holding cargo at its current location or, alternatively, transporting cargo from the current location to the next location. Thus, even though it is referred to as a "move leg," a move leg may include a cargo hold for a certain time period (e.g., for one or more shifts) at a given location. The load graph can include load routes. A load route can include a sequence of load legs. A load leg can include loading cargo onto a vehicle (e.g., a truck or trailer), holding cargo at its current location, or offloading cargo from a vehicle. The computer system can then use this framework of the default network graph, the move graph, and the load graph to rapidly respond to queries from client devices for route data.

By starting from the default network graph to derive the move and load graphs, the computer system has a significant computational head-start that allows it to generate those graphs faster and using fewer computing resources (e.g., memory, processing power, and energy) than may otherwise be possible. For instance, this may be significantly faster and less resource intensive than computing the move and load graphs from scratch each time. Also, separating the routes into move routes and load routes, which are distributed across two different graphs, can help simplify the computational problem so that it can be rapidly solved by the computer system.

Because the move and load graphs can be generated relatively quickly based on the current network-state data, the computer system can repeat the above process periodically. For example, the computer system can obtain updated network-state data and recompute the move and load graphs every hour. This can keep the move and load graphs up-to-date based on the current state of the network. The default network graph can also be recomputed periodically, albeit at a slower interval than the move and load graphs, after which the move and load graphs may be updated. For example, the default network graph can be recomputed weekly based on an updated set of default network data. In this way, the techniques described herein can make it both fast and practical for a computer system to generate up-to-date network graphs in the cargo transport context, when conventionally it is neither.

In some examples, the computer system can save the move graph and the load graph in memory (e.g., RAM), so that the graphs can be rapidly accessed and searched. After storing them in memory, the computer system can use a specialized crawler to search the graphs to identify routes (e.g., move routes or load routes) that satisfy queries from client devices. In some examples, the crawler can be configured to execute a bidirectional search process, which can significantly expedite the process of identifying routes that satisfy the query parameters, thereby reducing latency and improving responsiveness. Additionally or alternatively, the crawler can be programmed to follow a set of rules to help it identify routes faster than may otherwise be possible. By dividing up the routes into move routes and load routes in different graphs that are stored in memory, as well as providing an intelligent crawler, the computer system can more rapidly search through route options to generate query results using fewer computing resources than may otherwise be possible.

In some examples, the move graph and the load graph can be spaciotemporal graphs in which each node represents not only a location but also a time. For example, each node may represent a physical location, such as a service center, as well as a time, such as a particular time window during a 24-hour day. Because each node corresponds to a location and time, each link between nodes not only specifies a spatial path between the corresponding locations, but also specifies the times of day at which the path starts and ends. Generating the move and load graphs as spaciotemporal graphs, rather than just spatial graphs, may be particularly useful in the cargo transport context, because the network is in a constant state of flux throughout the day as pickup and delivery operations are ongoing.

After generating the move graph and/or the load graph, in some examples an optimization system can further analyze the routes in the move graph and/or the load graph to construct an optimization model. The optimization model can include one or more objective functions and one or more constraints, which can be derived based on the routes in the move graph and/or the load graph. The optimization system can then execute the optimization model to determine an optimal set of routes for moving cargo through the network.

More specifically, the move graph may include a feasible set of move routes, including default move routes and one or more alternative move routes (e.g., non-default move routes generated based on the network state data). The load graph may include a feasible set of load routes, including default load routes and one or more alternative load routes (e.g., non-default load routes generated based on the network state data). But, each of these sets of routes may be extremely large. For example, the feasible set of move routes and the feasible set of load routes may each include tens-of-thousands of routes. It may therefore be desirable to determine which combination of those routes is most optimal, in the sense that it best satisfies the one or more objective functions of the optimization model subject to the constraints.

To identify the optimal set of routes, the optimization system can begin by constructing an optimization model, such as a multicommodity flow model. The optimization system can construct the optimization model based on the feasible sets of routes in the move graph and/or the load graph. The optimization model can define a combinatorial optimization problem that is solvable to identify an optimal set of routes that most closely satisfies the one or more objective functions subject to the one or more constraints. The optimization system can then solve the optimization model to identify the optimal set of routes. In some examples, the optimal set of routes can be spaciotemporal routes, in that they indicate not only locations but also times. For example, each of the optimal routes can extend from a starting location and a starting time to an end location and an end time. After identifying the optimal set of routes, the optimization system can provide some or all of the optimal set of routes to various parties in the network. This can facilitate transport of the cargo through the network in accordance with the optimal set of routes.

This illustrative example is given to introduce the reader to the general subject matter discussed herein and the disclosure is not limited to this example. The following sections describe various additional non-limiting examples.

FIG. 1 shows a block diagram of an example of a system 100 for implementing a network graph framework according to some aspects of the present disclosure. The system 100 includes a computer system 130 comprising one or more computing devices. Examples of the computing devices can include clients, servers, desktop computers, laptop computers, or any combination of these. In some examples, the computer system 130 can be a distributed computing system that includes multiple networked nodes (e.g., physical or virtual machines) in communication with one another. Examples of such a distributed computing system can include a cloud computing system, a computing cluster, or a data grid.

The computer system 130 can be configured to automatically generate network graphs usable in the transport context to identify routes for cargo through a carrier network. There can be many such routes, some of which may be static and others of which may be dynamic. As a result, it is normally slow and computationally challenging to generate such network graphs. But in some examples, the computer system 130 can apply a network graph framework that can simplify and expedite the process. The network graph framework may be distributed across multiple nodes of the computer system 130 and performed in parallel, which can further expedite the computations.

More specifically, the computer system 130 can receive a set of default network data 104. The computer system 130 can receive the default network data 104 from one or more data sources, such as one or more databases or computing devices. The default network data 104 may be created by a network operator or another user based on known information about the state (e.g., topology) of the network and other knowledge. The default network data 104 can include a default set of routes for transporting cargo through the network. Each route can be defined by a set of parameters including an origin location, a start time (e.g., origin day and origin shift), a destination location, an end time (e.g., destination day and destination shift), and a transport mode. The transport mode can indicate which entity is to transport cargo along the route. One such transport mode can be a carrier mode, in which the carrier (operating the network) transports cargo along the route. Another transport mode can be a third-party mode, in which a third party (e.g., another carrier company) transports cargo along the route. Each route can include one or more legs between the origin location and the destination location, where each leg can involve the transport of cargo between two locations.

The default set of routes can serve as a baseline set of routes for transporting cargo through the network. The default network data 104 can be valid for a certain time interval, such as one week. During that time interval, the default network data 104 can remain fixed (e.g., unchanged). At the end of that time interval, the default network data 104 can be updated. By periodically updating the default network data 104, such as at a weekly interval, it can remain relatively current.

After receiving the default network data 104, the computer system 130 can execute a graph generator 106. The graph generator 106 is software that can generate a default network graph 108 based on the default network data 104. The default network graph 108 can include nodes and links. The nodes can represent physical locations in the network, such as physical sorting and assembly locations in a carrier network. The nodes may also represent times of day. For instance, each node can represent an individual location, day, and shift (e.g., a work shift at a company) that spans a certain time period (e.g., 9:00 AM-5:00 PM) on that particular day. Links between nodes can represent routes between the locations/shifts. For example, a link can extend from an outbound shift at a first location to an inbound shift at a second location. Thus, the default network graph 108 can be a spaciotemporal graph that includes both location and time dimensions.

To generate the default network graph 108, the graph generator 106 can begin by establishing the nodes based on the current physical locations in the network, which can be described in the default network data 104. In some examples, rather than generating a single node per location, the graph generator 106 can create multiple nodes per location, where each node represents a different time of day at that location. For example, if there are 4 shifts in a 24-hour day at a given location, the graph generator 106 can create four nodes for that location, where each node represents the location and a different one of the shifts. The various shifts at each location can also be defined in the default network data 104, which can dictate how many nodes are created per location.

After generating the nodes, the graph generator 106 can generate links between the nodes for valid routes between the nodes. The routes may also be defined in the default network data 104. In some examples, the graph generator 106 can rely on a set of predefined constraints or rules to generate the nodes and/or links. For example, given how carrier services operate, it may be that cargo is always sent out from a location during an outbound shift and is always received at the location during an inbound shift. Thus, the graph generator 106 can impose a constraint that any LH leg starting at an outbound shift of a first location should end at an FAC shift of a second location. Likewise, any LH leg starting at an FAC shift of a first location should end at an IB shift of a second location, and so on (IB→Day, and Day→OB, etc). HSS move legs, which can travel more than one shift before a stop, are not restricted in this manner. All newly picked up freight enters the network on the OB shift, and must be delivered to its final destination on or before an IB shift (though the number of days from origin to destination varies with the particular OD of the shipment). These and other constraints can be applied to establish valid routes in both time and space from various origins to destinations throughout the network.

In some examples, the graph generator 106 can determine the routes for the default network graph 108 using one or more optimization algorithms. The optimization algorithms can be configured to select the routes based on one or more constraints and one or more objective functions. Because the selected routes can be whichever combination of routes best satisfies the objective function(s) subject to the constraints, those routes can be referred to as an optimal set of routes. The optimization algorithms can be configured to iteratively analyze the route options to identify the optimal set of routes. The default network graph 108 can then be configured with the optimal set of routes. Once generated, the default network graph 108 can serve as a foundation from which additional graphs, such as a move graph 116 and a load graph 118, can be generated.

After generating the default network graph 108, the computer system 130 can receive network state data 110. The network state data 110 can indicate the current state of the network (e.g., the current locations of vehicles, drivers, and cargo in the network) as of the point in time when it was collected. The network state data 110 may be gathered from one or more other computing devices, which may be positioned at various locations throughout the network. For example, the network may include client devices 114a-n positioned at service centers and assembly centers throughout the network. As trucks arrive at and leave each location, and as cargo arrives at and leaves each location, individuals at those locations can input corresponding data into the corresponding client device to keep the system 100 up-to-date about the current operations in the network. The computer system 130 can communicate with each of these client devices 114a-n, for example via application programming interfaces, to automatically collect such information to generate the network state data 110. These communications may take place via a communications network 112, which may include a public network (e.g., the Internet) and/or a private network (e.g., a local area network).

In some examples, the computer system 130 can also receive other data 132 relating to various factors that affect the network state, such as weather and traffic information which may affect the available routes, holiday and weekend information which may affect the number of drivers and amount of cargo, etc. The computer system 130 can receive some or all of this information by communicating with third party systems, such as weather and traffic services, via the communications network 112.

Based on the default network graph 108 and the network state data 110, the graph generator 106 can generate a move graph 116. The graph generator 106 may also generate the move graph 116 based on the other data 132. The move graph 116 can be separate from the default network graph 108. The move graph 116 can include move routes indicating how cargo can be moved through the network from origins to destinations. Each move route can be defined by a set of parameters including an origin location, a start time (e.g., start day and shift), a destination location, and an end time (e.g., end day and shift). Each move route can include one or more move legs between the origin location and the destination location (and each of those move legs can have an associated move mode, such as LH or HSS). Each move leg can involve the transport of cargo between two locations or holding cargo at a given location for a certain time period. Because the move graph 116 is generated based on the network state data 110, it can be more up-to-date than the default network graph 108. And by starting from the default network graph 108, the move graph 116 can be generated significantly faster and with less computational overhead than generating the entire move graph 116 from scratch.

To generate the move graph 116, the graph generator 106 can start from the default network graph 108 and make adjustments to account for the current state of the network (e.g., current truck and cargo locations) along with other factors, such as weather conditions, delays, possible diversions from default routes, etc. This may involve adding routes, removing routes, or changing existing routes based on the current state of the network and the other factors. For example, after the default network graph 108 was generated, a truck may have driven from a first location to a second location to deliver a package. Because the truck is no longer at the first location, a route involving the truck driving from the first location to the second location may be invalid until the truck returns to the first location. By taking these kinds of factors into account, the move graph 116 can account for changes in the network that have occurred since the default network graph 108 was generated, so that the move graph 116 is more up-to-date than the default network graph 108.

Figure 2:
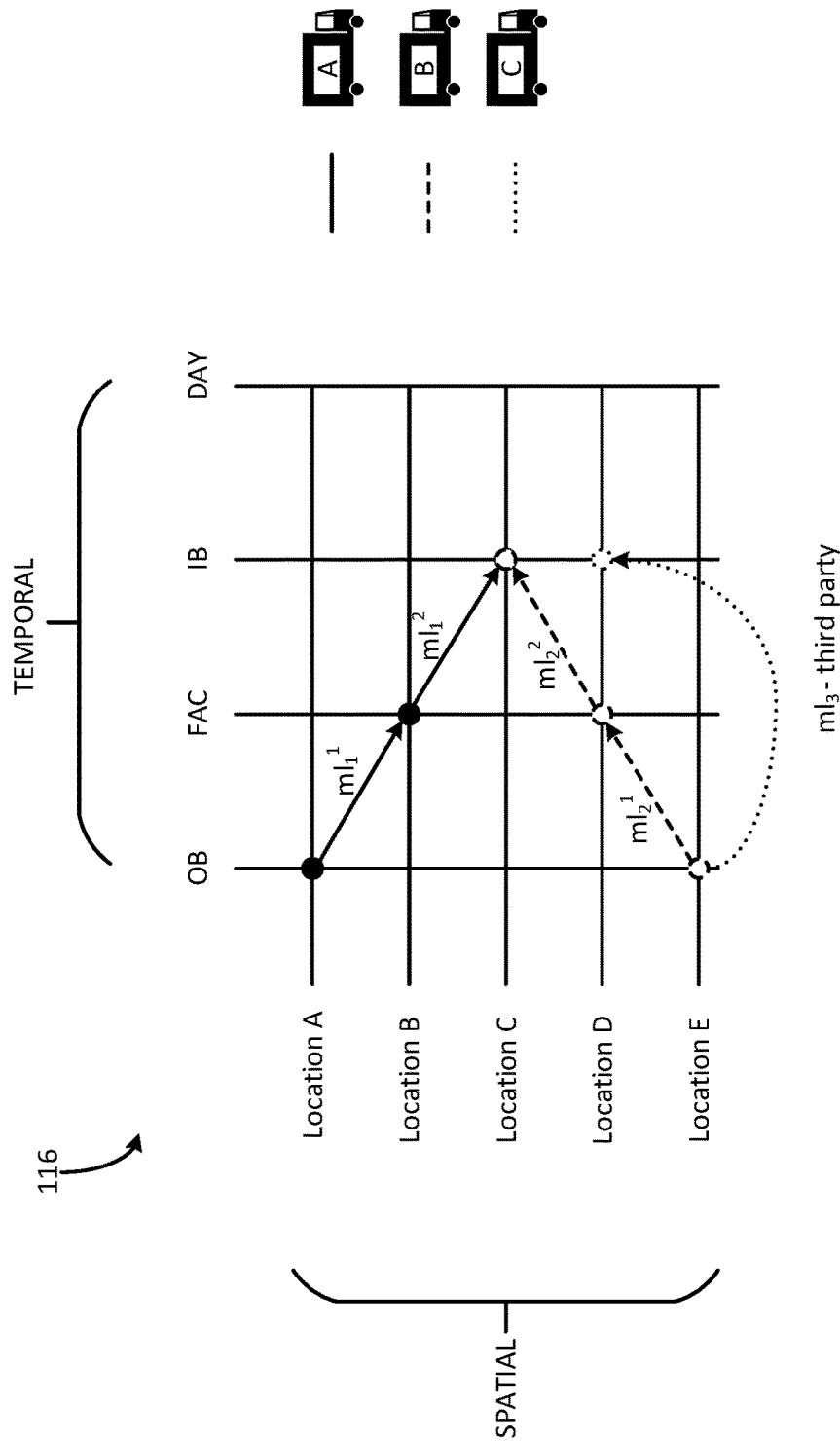
FIG. 2 shows an example of a move graph according to some aspects of the present disclosure.

Like the default network graph 108, the move graph 116 may be a spaciotemporal graph in which each node represents not only a location but also a time. One example of such a move graph 116 is shown in FIG. 2. As shown, the move graph 116 includes five locations—Location A through Location E. The move graph 116 also includes four shifts per location per day—an outbound shift (OB), a freight assembly center shift (FAC), an inbound shift (IB), and a day shift (DAY). As shown, the move graph 116 includes three move routes between those locations and shifts. The first move route is depicted in a solid line and extends from the outbound shift at Location A to the inbound shift at Location C. It includes two move legs, labeled $ml_1^1$ and $ml_1^2$. The second move route is depicted in a dashed line and extends from the outbound shift at Location E to the inbound shift at Location C. It includes two move legs, labeled $ml_2^1$ and $ml_2^2$. The third move route is depicted in a dotted line and extends from the outbound shift at Location E to the inbound shift at Location D. It includes one move leg, labeled $ml_3$. In some examples, the one or more of the move routes may be implemented by a third party carrier service to assist the carrier, for example if the carrier does not have trucks positioned to make the trip or if the carrier does not have drivers who can be out on the road for the duration of the trip. In the example shown in FIG. 2, the third move route is implemented by such a third party carrier service. Of course, these examples are simplified for illustrative purposes. In normal operation, the move graph 116 may have hundreds or thousands of move routes that extend between dozens or hundreds of locations, with each move route including any number of move legs performed by the carrier and/or third party carrier services.

Figure 4:
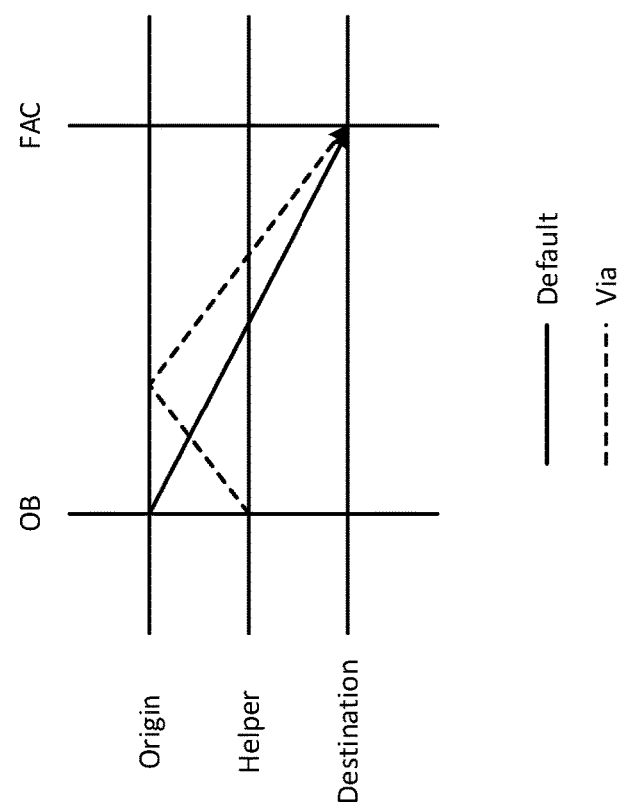
FIG. 4 shows an example of a via according to some aspects of the present disclosure.

In some examples, the move graph 116 may include vias. Vias are another strategy for moving freight in a carrier network, such as an LTL (less-than-truckload) network, even if vehicles and drivers are not all in the correct position for the cargo encountered that day. Vias can be useful when an origin location has to move more trailers than it has vehicles or drivers to do so. In this situation, a helper can be used. A helper can be an additional driver or vehicle. The helper can drive from a helper location to the origin location, pick up one or more of the "uncovered" trailers, and move them to destination on behalf of the origin location. In this way, the trailers are delivered to the destination by the helper. This route from the helper location through the origin location to the destination location is referred to as a via. One example of such a via is shown in graph 400 of FIG. 4. As shown in a dashed line, the helper location can help the origin location (during the outbound shift) move a trailer to the destination location (during the FAC shift). This may be an alternative method, other than using the default pathway shown in a solid line, to transport the trailer from the outbound shift of the origin location to the FAC shift of the destination location. Vias can also be used to "drop" trailers at a given location to save a trip all the way into the FAC and back out to the destination location of the trailer.

Referring back to FIG. 1, in some examples, the graph generator 106 can additionally or alternatively generate a load graph 118. The graph generator 106 can generate the load graph 118 based on default network graph 108 and the network state data 110. In some examples, the graph generator 106 may also generate the load graph 118 based on the other data 132. The load graph 118 can be separate from the move graph 116 and the default network graph 108. The load graph 118 can include load routes indicating how cargo is loaded and unloaded through the network from origins to destinations. Each load route can be defined by a set of parameters including an origin location, a start time, a destination location, and an end time. Each load route can include one or more load legs between the origin location and the destination location, where each load leg can involve loading cargo onto a vehicle or offloading cargo from the vehicle (and each load leg may have an associated move mode, such as LH or HSS). Because the load graph 118 is generated based on the network state data 110, it can be more up-to-date than the default network graph 108. And by starting from the default network graph 108, the load graph 118 can be generated significantly faster and with less computational overhead than generating the entire load graph 118 from scratch.

To generate the load graph 118, the graph generator 106 can start from the default network graph 108 and make adjustments to account for the current state of the network (e.g., current truck and cargo locations) along with other factors, such as weather conditions, delays, possible diversions from default routes, etc. This may involve adding routes, removing routes, or changing existing routes based on the current state of the network and the other factors. For example, after the default network graph 108 was generated, weather problems may have closed a route. So, the graph generator 106 can account for the closed route. By taking these kinds of factors into account, the load graph 118 can account for changes in the network that have occurred since the default network graph 108 was generated, so that the load graph 118 is more up-to-date than the default network graph 108.

Figure 5:
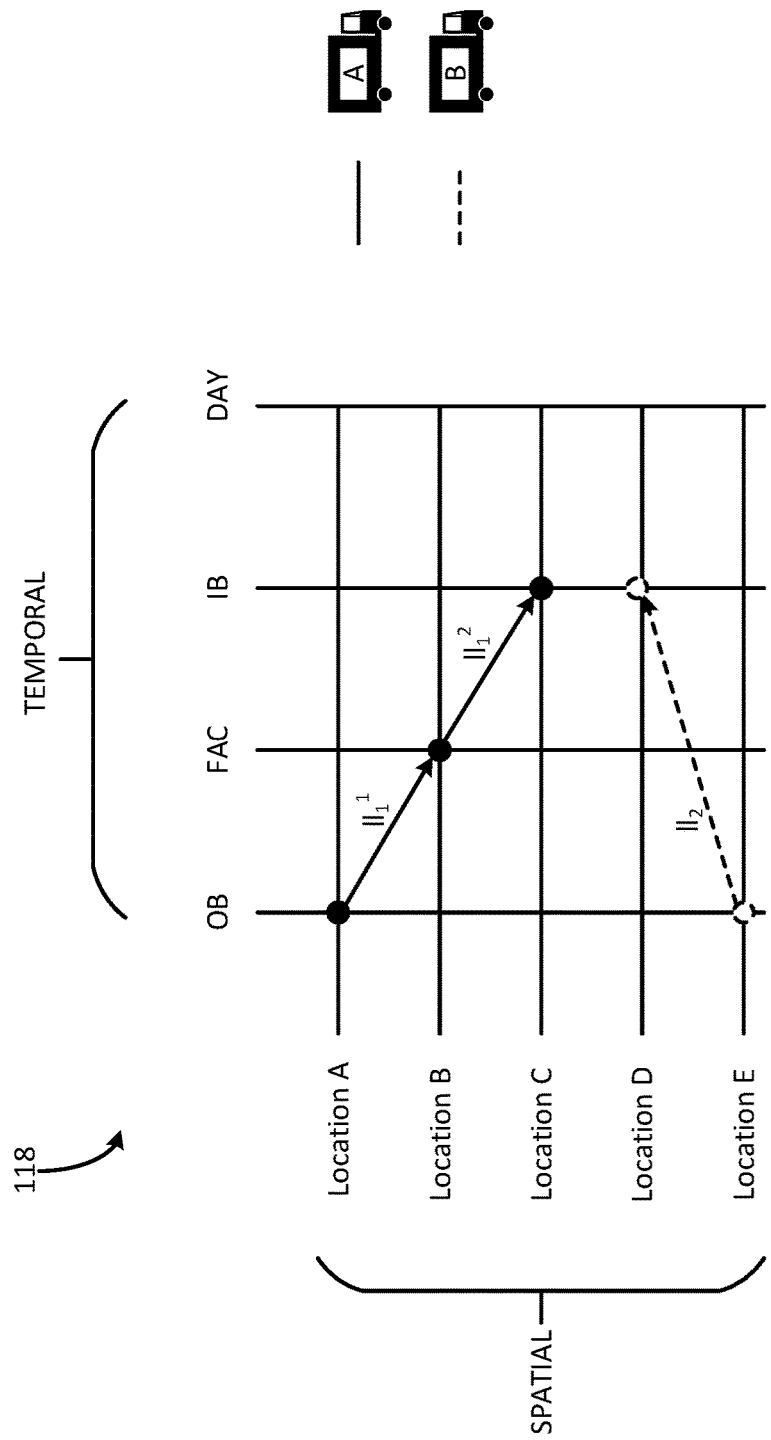
FIG. 5 shows an example of a load graph according to some aspects of the present disclosure.

Like the default network graph 108, the load graph 118 may be a spaciotemporal graph in which each node represents not only a location but a time (e.g., a day and shift). One example of such a load graph 118 is shown in FIG. 5. As shown, the load graph 118 includes five locations—Location A through Location E. The load graph 118 also includes four shifts per location per day—outbound, FAC, inbound, and DAY. As shown, the load graph 118 includes two load routes between those locations and shifts. The first load route is depicted in a solid line and extends from the outbound shift at Location A to the inbound shift at Location C. It includes two load legs, labeled $ll_1^1$ and $ll_1^2$. The first load leg ($ll_1^1$) may involve loading cargo onto a truck during the outbound shift on a particular day at Location A, and then offloading the cargo from the truck during the FAC shift at Location B. The second load leg ($ll_1^2$) may involve loading cargo onto a truck during the FAC shift at Location B and offloading the cargo from the truck during the inbound shift at Location C. The second load route is depicted in a dashed line and extends from the outbound shift at Location E to the inbound shift at Location D. It includes one load leg, labeled $ll_2^2$. That load leg can involve loading cargo onto a truck during the outbound shift at Location E and offloading the cargo from the truck during the inbound shift at Location D. Of course, these examples are simplified for illustrative purposes. In normal operation, the load graph 118 may have hundreds or thousands of load routes between dozens or hundreds of locations, with each load route including any number of load legs performed by the carrier and/or third party carrier services. Like the move graph 116, in some examples the load graph 118 can include vias.

In some examples, the load graph 118 may specify diversions from default routes. A diversion can be an additional or alternative route that is a modification of a default route. A diversion may be required or desired for any number of reasons, for example if a load leg along a default route is not currently viable (e.g., due to traffic or weather conditions) or because of the cargo in the network that day. For instance, depending on which cargo is in the network on that day, by using alternative load routes for all or a portion of the cargo going from an origin to a destination, the cargo can be packed in fewer trailers, thus requiring fewer tractors to move the cargo. This can result in significant savings to the carrier.

Figure 3:
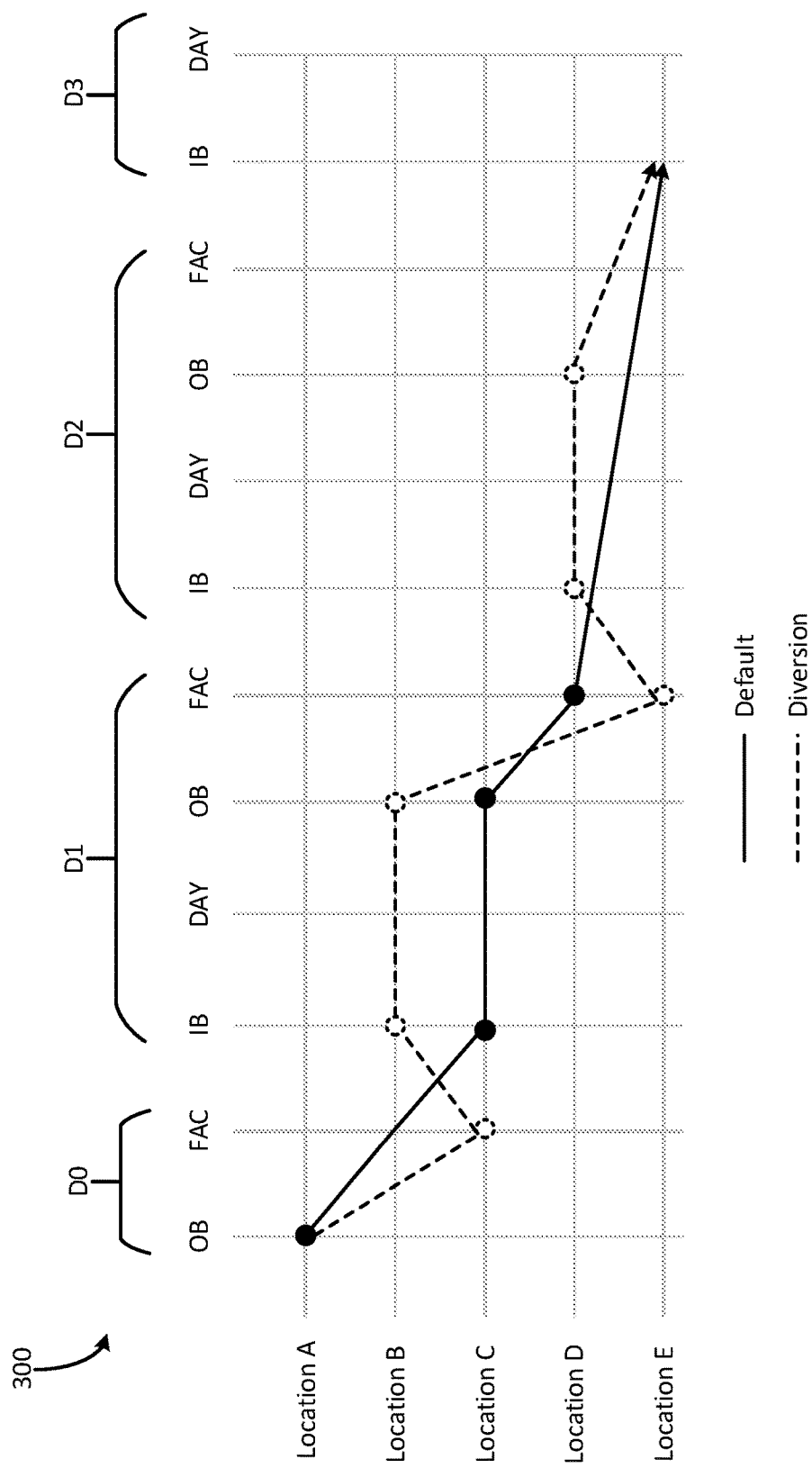
FIG. 3 shows an example of a diversion according to some aspects of the present disclosure.

One example of a diversion is shown in FIG. 3. As shown, the load graph 300 includes a default route that extends from Location A to Location E. The default route can span four days, designated D0-D3. The default route can include four load legs-outbound at Location A to inbound at Location C, inbound at Location C to outbound at Location C, outbound at Location C to FAC at Location D, and FAC at Location D to inbound at Location E. Note that the third load leg involves holding the cargo at Location C from the inbound shift to the outbound shift. Holds may be beneficial if the cargo is ahead of schedule, because they can be tactically used to pack more cargo onto fewer, fuller trailers (which helps to produce better "consolidation"). The load graph 300 also includes a diversion that extends from Location A to Location E. The diversion can include seven load legs- outbound at Location A to FAC at Location C, FAC at Location C to inbound at Location B, inbound at Location B to outbound at Location B, outbound at Location B to FAC at Location E, FAC at Location E to inbound at Location D, inbound at Location D to outbound at Location D, and outbound at Location D to inbound at Location E. The graph generator 106 may include this diversion for any suitable reason, for example of Location C is inaccessible (e.g., due to construction) and is no longer a viable intermediary.

Referring back to FIG. 1, after generating the move graph 116 and the load graph 118, they may each be stored in memory. For example, one or both of the graphs 116, 118 may be stored in random access memory (RAM). This may allow the graphs 116, 118 to be quickly accessed and searched in response to queries 122 from client devices, such as client devices 114a-n.

More specifically, a client device 114a can transmit a query 122 to the computer system 130 for routes that satisfy certain query parameters. Examples of the query parameters can include an origin location, an origin time, a destination location, a destination time, whether diversions are allowed, a maximum amount of diversion time or diversion distance that is acceptable, whether a certain transport mode is allowed, or any combination of these. For example, the client device 114a may request all routes spanning from Raleigh, North Carolina to Los Angeles, California between March 1 and March 10. In response to receiving the query 122, the computer system 130 can execute an intelligent crawler 120 to search the default network graph 108, the move graph 116, and/or the load graph 118 for one or more routes that satisfy the query parameters. The crawler 120 can search the graphs while they are in memory, which can expedite the search process. The computer system 130 can then provide the one or more identified routes to the client device 114a in a reply 128 to the query 122.

The crawler 120 can include logic for searching through the graphs to identify the routes that satisfy the query parameters. In some examples, the logic can include a bidirectional search algorithm 124. A bidirectional search algorithm 124 is a graph search algorithm that finds the shortest path from an origin location to a destination location. It runs two simultaneous searches-one forward from the origin location and one backward from the destination location-stopping when the two meet. A bidirectional search can be faster and less complex than a unidirectional search, because a bidirectional search splits the search process into two parts that are performed concurrently, where each part is only half the size of performing a unidirectional search all the way from the origin location to the destination location.

In some examples, the crawler 120 may use a predefined set of rules 126 to facilitate the search process. The rules 126 may account for business and other constraints that can be used to filter out routes and simplify the search process. The rules 126 may include static rules, dynamic rules, or both. A static rule is a rule whose application does not change over time. One example of a static rule may be that a certain entity (e.g., customer) does not want their cargo going through a certain location. The crawler 120 will always apply that rule with respect to that entity's cargo, until the rule is expressly revoked. A dynamic rule is a rule whose application depends on one or more dynamic factors, such as time. One example of a dynamic rule can be to ignore certain routes depending on the time of day, since the route may have more or less traffic at different times. By applying the set of rules 126, the crawler 120 may know to ignore certain routes or focus on certain routes to expedite the search process, thereby reducing consumption of computing resources.

As noted earlier, over time, the computer system 130 can receive updated network-state data 110 and/or updated other data 132. The computer system 130 can then use this updated data 110, 132 to update the move graph 116 and the load graph 118. The computer system 130 can perform these updates periodically, for example hourly or daily. Because the move graph 116 and load graph 118 can be updated more frequently than the default network graph 108, those graphs 116, 118 can be more up-to-date than the default network graph 108.

Figure 6:
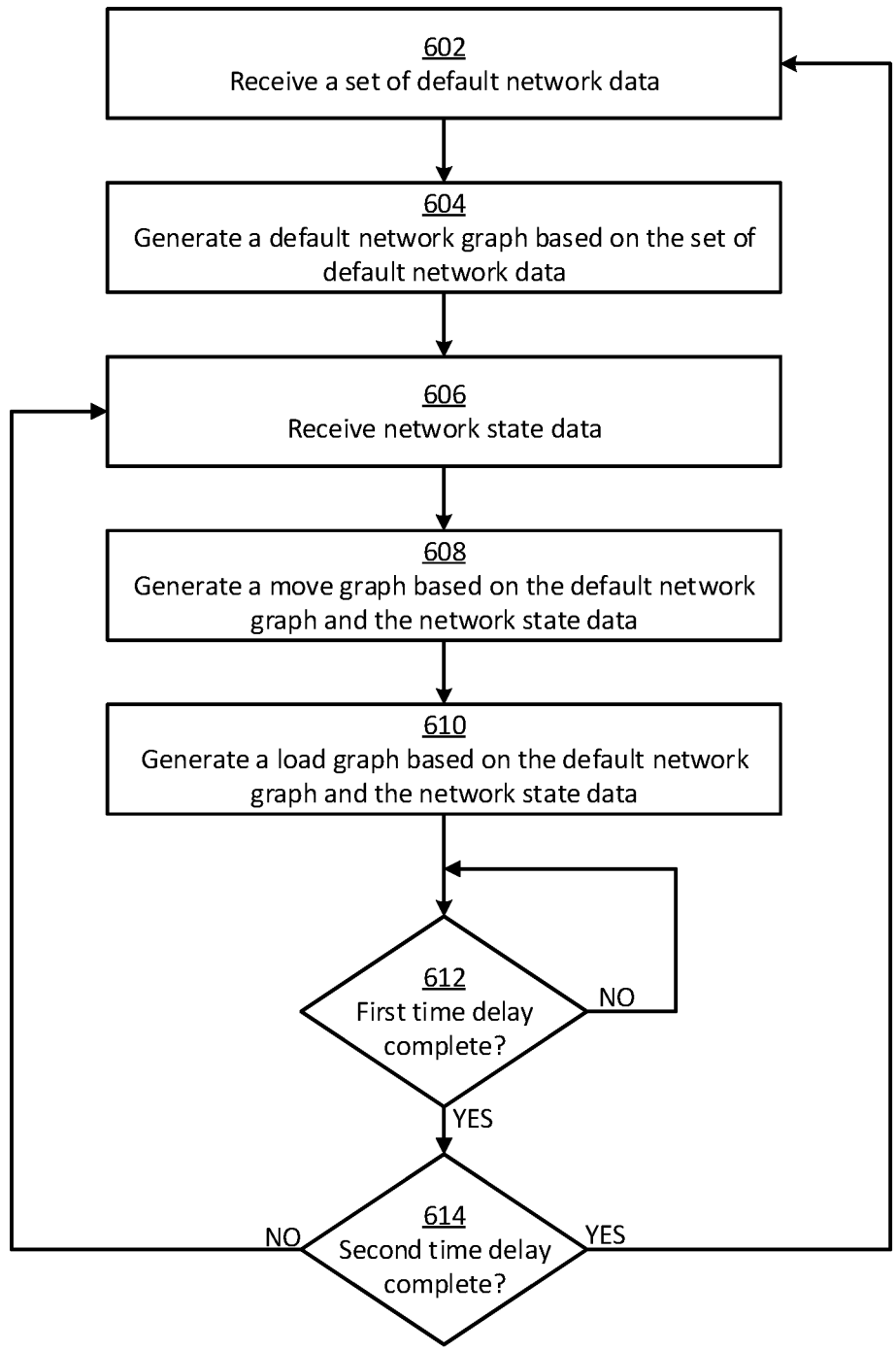
FIG. 6 shows a flowchart of an example of a process for generating network graphs according to some aspects of the present disclosure.

Turning now to FIG. 6, shown is a flowchart of an example of a process for generating network graphs according to some aspects of the present disclosure. Other examples may involve more operations, fewer operations, different operations, or a different sequence of operations than is shown in FIG. 6. The operations of FIG. 6 are described below with reference to the components of FIG. 1 described above.

In block 602, a computer system 130 receives a set of default network data 104 from one or more sources, such as one or more databases. The computer system 130 may receive the default network data 104 from the one or more sources via a communications network 112. In some examples, the network can be a carrier network and the default network data 104 can include a default set of routes for transporting cargo through the carrier network. Alternatively, the network may be another type of network (e.g., other than a carrier network) and the default set of routes may be for transmitting other types of content through the network. For example, the network may be a computer network that includes multiple hardware devices. In some such examples, the default set of routes may be for transmitting files (e.g., images or videos) through the computer network.

In block 604, the computer system 130 generates a default network graph 108 based on the default network data 104. For example, the computer system 130 can execute a graph generator 106 to generate the default network graph 108. The graph generator 106 may begin by generating the nodes in the default network graph 108. In the cargo context, the nodes can correspond to physical locations, operated by the carrier, through which cargo is transported in the network. In other contexts, the nodes may correspond to hardware components, such as network hubs or routers, or software components, such as virtual machines and software applications. After generating the nodes, the graph generator 106 can establish links between the nodes. In some examples, the graph generator 106 may adhere to one or more predefined constraints to establish the nodes and links. The predefined constraints may be configured to prevent against problems, such as duplicate routes or conflicting routes. Duplicate routes are two or more routes that are substantially identical to one another. Conflicting routes are two or more routes that conflict with one another, for example in time or space.

In block 606, the computer system 130 receives network state data 110. The computer system 130 can receive the network state data 110 from one or more sources, such as the client devices 114*a-n* positioned at the physical locations in the network or other components corresponding to the nodes. For example, in the cargo transport context, the computer system 130 can receive the network state data 110 from some or all of the client devices positioned at some or all of the physical locations in the network. In other contexts, the computer system 130 can receive the network state data 110 from some or all of the hardware or software components in the network.

In block 608, the computer system 130 generates a move graph 116 based on the default network graph 108 and the network state data 110. In some examples, the computer system 130 may further generate the move graph 116 based on other data 132. The move graph 116 includes move routes, which are distinct from load routes, though in some cases aspects of the two may overlap (e.g., they may have one or more overlapping legs).

In block 610, the computer system 130 generates a load graph 118 based on the default network graph 108 and the network state data 110. In some examples, the computer system 130 may further generate the load graph 118 based on other data 132. The load graph 118 includes load routes, which are distinct from the move routes, as noted above.

In block 612, the computer system 130 determines whether a first time delay is complete. The first time delay can be a period of time between updates to the move graph 116 and the load graph 118. In other words, the first time delay can correspond to the frequency at which the move graph 116 and the load graph 118 are updated. If the first time delay is not complete, the computer system 130 can wait until it is complete. Once it is complete, the process can continue to block 614.

In block 614, the computer system 130 determines whether a second time delay is complete. The second time delay can be a period of time between updates to the default network graph 108. In other words, the second time delay can correspond to the frequency at which the default network graph 108 is updated. The second time delay can be longer than the first time delay. If the second time delay is not complete, the process can return to block 606 and repeat, for example to update the move graph 116 and the load graph 118 based on updated network-state data 110. If the second time delay is complete, the process can return to block 602 and repeat, for example to update the default network graph 108, the move graph 116, and/or the load graph 118. This process can integrate any number of times to periodically update the graphs 108, 116, 118 at different frequencies.

Figure 7:
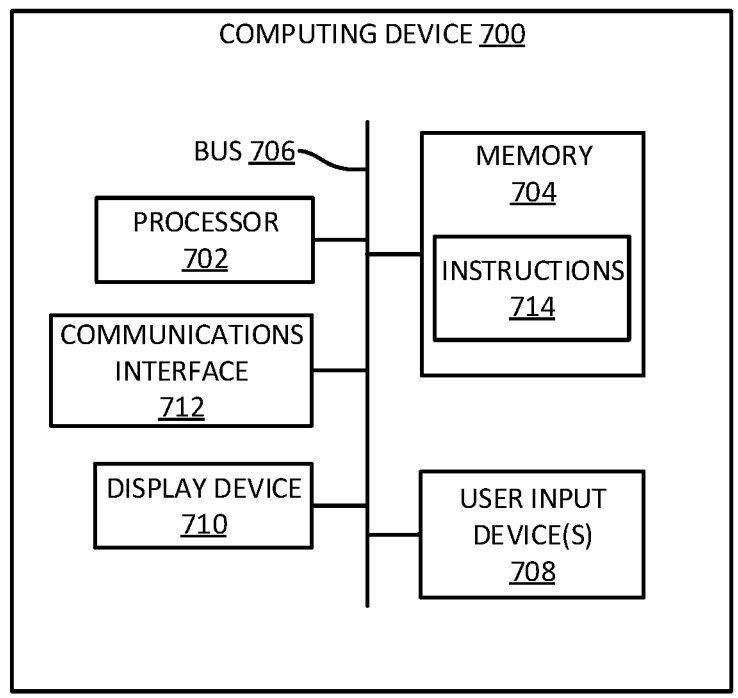
FIG. 7 shows a block diagram of an example of a computing device usable to implement some aspects of the present disclosure.

Turning now to FIG. 7, shown is a block diagram of an example of a computing device 700 usable to implement some aspects of the present disclosure. In some examples, the computing device 700 may correspond to any of the client devices or computer systems described herein.

The computing device 700 includes a processor 702 that is in communication with the memory 704 and other components of the computing device 700 using one or more communications buses 706. The processor 702 is configured to execute processor-executable instructions 714 stored in the memory 704 to perform one or more processes described herein.

As shown, the computing device 700 also includes one or more user input devices 708 (e.g., a keyboard, mouse, touchscreen, video capture device, and/or microphone) to accept user input and the display device 710 to provide visual output to a user. The computing device 700 further includes a communications interface 712. In some examples, the communications interface 712 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a videoconferencing server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

Figure 8:
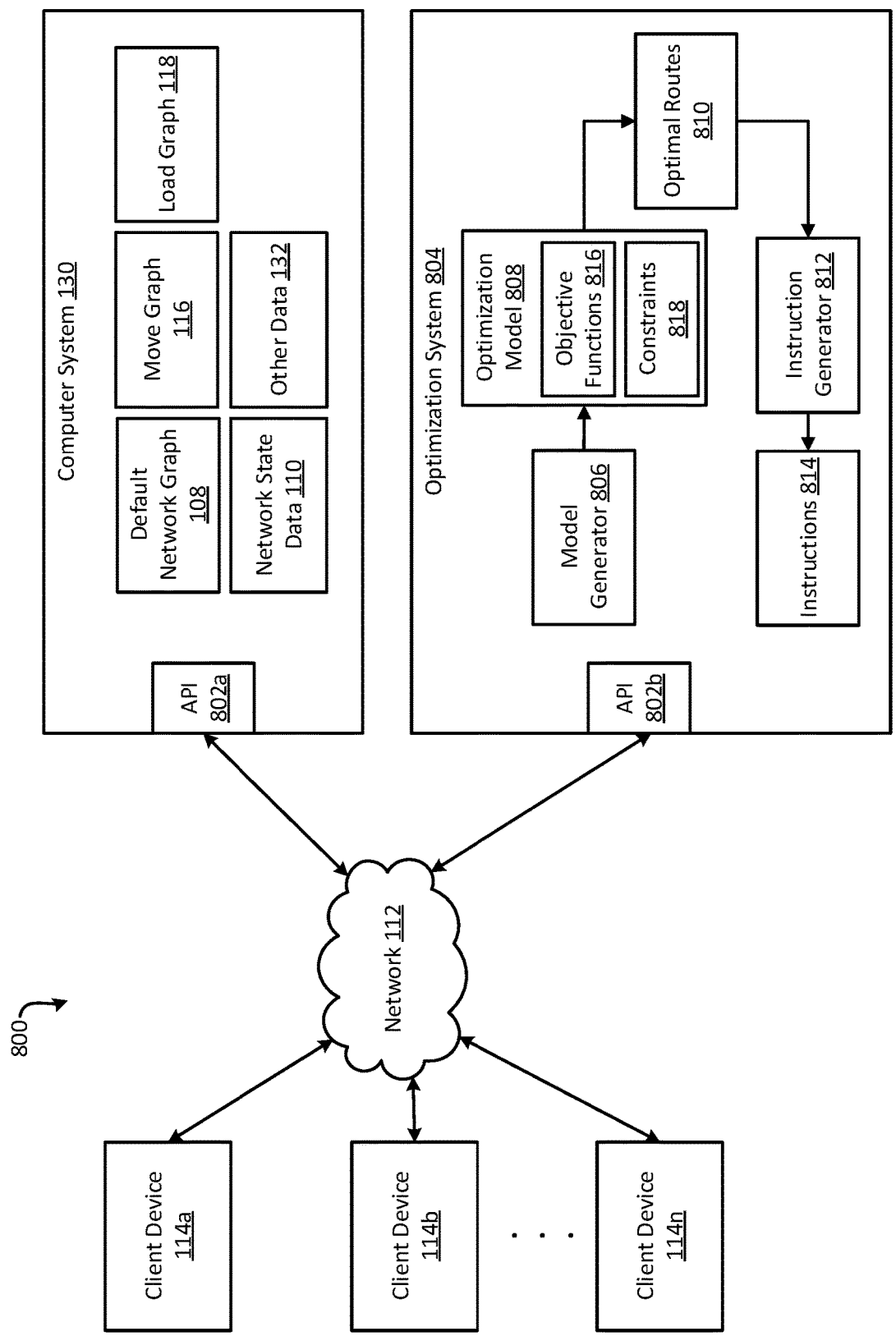
FIG. 8 shows a block diagram of another example of a system according to some aspects of the present disclosure.

FIG. 8 shows a block diagram of another example of a system 800 according to some aspects of the present disclosure. The system 800 includes the computer system 130 and client devices 114a-n of FIG. 1. As described above, the computer system 130 can generate a default network graph 108 and then, from the default network graph 108, generate a move graph 116 and a load graph 118. The move graph 116 and the load graph 118 can be derived from the default network graph 108 and generated based on network state data 110 and other data 132.

The move graph 116 may include a feasible set of move paths, and the load graph 118 may contain a feasible set of load paths. The feasible set of move paths may include a default move path that is determined independently of the network state data 110, as well as alternative move paths determined based on the network state data 110 and/or the other data 132. Likewise, the feasible set of load paths may include a default load path that is determined independently of the network state data 110, as well as alternative load paths determined based on the network state data 110 and/or the other data 132. The feasible set of move paths and the feasible set of load paths may each constitute a large number of paths, for example numbering in the hundreds of thousands. Given this large number of options for transporting cargo through the network, it may be challenging to identify which combination of routes would produce the most optimal results, for example in terms of speed or cost of transporting cargo through the network.

To help solve the above-mentioned problem, the system 800 can further include an optimization system 804. Although the optimization system 804 is shown separately from the computer system 130 in FIG. 8, it will be appreciated that the optimization system 804 may be provided in any suitable location of the system 800, including as part of the computer system 130. The optimization system 804 can be configured to identify an optimal set of routes 810, from among the feasible sets of routes generated by the computer system 130, for transporting cargo through the network. The optimal set of routes 810 can be a subset of the feasible set of routes that most closely satisfies an objective function 816 subject to one or more mathematical constraints 818, where the objective function 816 and the constraints 818 are defined parts of an optimization model 808. The optimal set of routes 810 may include move routes, load routes, or both. Like the move routes and the load routes, the optimal set of routes 810 can be spaciotemporal routes indicating cargo movements through both space and time.

More specifically, the optimization system 804 can include a model generator 806 that is configured to construct an optimization model 808 based on predetermined set of routes. The predetermined set of routes may include the routes in the default network graph 108, the move graph 116, and/or the load graph 118. The model generator 806 may also construct the optimization model 808 based on the network state data 110 and/or the other data 132. The optimization system 804 can receive the predetermined set of routes and any of the abovementioned data from the computer system 130, for example via one or more application programming interfaces (APIs) 802a-b. The model generator 806 can then use this information to construct any suitable type of optimization model 808. For example, the model generator 806 can construct a multicommodity flow model (e.g., where one OD is associated with each "commodity"), which can be a type of mixed integer programming (MIP) model. Constructing the optimization model 808 may involve determining one or more mathematical objective functions 816 and/or one or more mathematical constraints 818 based on the predetermined set of routes and any of the abovementioned data. The objective functions 816 may be configured to minimize cost, travel time, miles traveled, or any combination of these, associated with transporting the cargo through the network.

After constructing the optimization model 808, the optimization system 804 can execute the optimization model 808 to determine the optimal set of routes 810. For example, the optimization model 808 can define a mathematical optimization problem such as a combinatorial optimization problem or mixed integer program that can be solved to derive the optimal set of routes 810. The optimal set of routes 810 can be a particular combination of routes, selected from among predetermined set of routes, that most closely satisfies the one or more objective functions 816 subject to the one or more mathematical constraints 818. Thus, the term "optimal" is used herein in the objective mathematical sense. In some cases, the optimization system 804 may have sufficient processing power to fully solve the optimization problem to derive the optimal set of routes 810 in a reasonable amount of time. In other cases, it may take too long or consume too much processing power, or may otherwise be undesirable, for the optimization system 804 to fully solve the optimization problem. In those situations, the optimization process may be stopped after a predetermined timeframe (e.g., 15 minutes of execution time) and the optimal set of routes 810 can be whatever is the "best" mathematical solution to the optimization problem achieved as of the stopping point.

In some examples, the optimization system 804 can execute an iterative process using the optimization model 808 to determine the optimal set of routes 810. For example, the optimization model 808 can be executed in a first iteration in which vias and diversions (e.g., alternative load paths) in the predetermined set of routes are ignored to develop an initial solution (e.g., an initial set of routes) to the optimization problem. The initial solution may thus exclude vias and diversions. The optimization model 808 can then be executed again in a second iteration, starting from the initial solution. In the second iteration, diversions can be enabled and vias can still be ignored, to derive an intermediate solution (e.g., an intermediate set of routes). The intermediate solution may thus involve one or more diversions but still exclude vias. The optimization model 808 can then be executed again in a third iteration, starting from the intermediate solution. In the third iteration, vias can be enabled, to derive a final solution (e.g., a final optimal set of routes). The final solution may thus involve both vias and diversions.

By implementing the abovementioned iterative process, the optimization system 802 can more quickly solve the optimization problem by breaking it down into smaller subparts that are more readily solved. In contrast, alternative approaches may not yield a solution in a suitable amount of time or at all. For example, trying to solve the entire optimization problem with both vias and diversions enabled from the start may present an intractable problem, which can take weeks or longer to solve using the fastest computers available today. Since it may be desirable for the optimization system 804 to update the set of optimal routes relatively frequently (e.g., at a daily interval, or even every 10-20 minutes in some cases) given the highly dynamic nature of the network, it may be unacceptable for this optimization process took weeks or longer to complete. But by implementing the iterative technique described above, the optimization system 804 may be able to obtain an adequate solution to the optimization problem fast enough (e.g., in 10-15 minutes or less) to provide frequent updates.

The optimal routes 810 can indicate cargo movements through the network over a predefined future time window. For example, the optimal routes 810 can indicate the movement of cargo throughout the network over the next 24 hours. This 24-hour period can start at a current shift on the current day and end at the same shift on the following day. For example, the 24-hour period can extend from the outbound (OB) shift today to the OB shift tomorrow.

Figure 9:
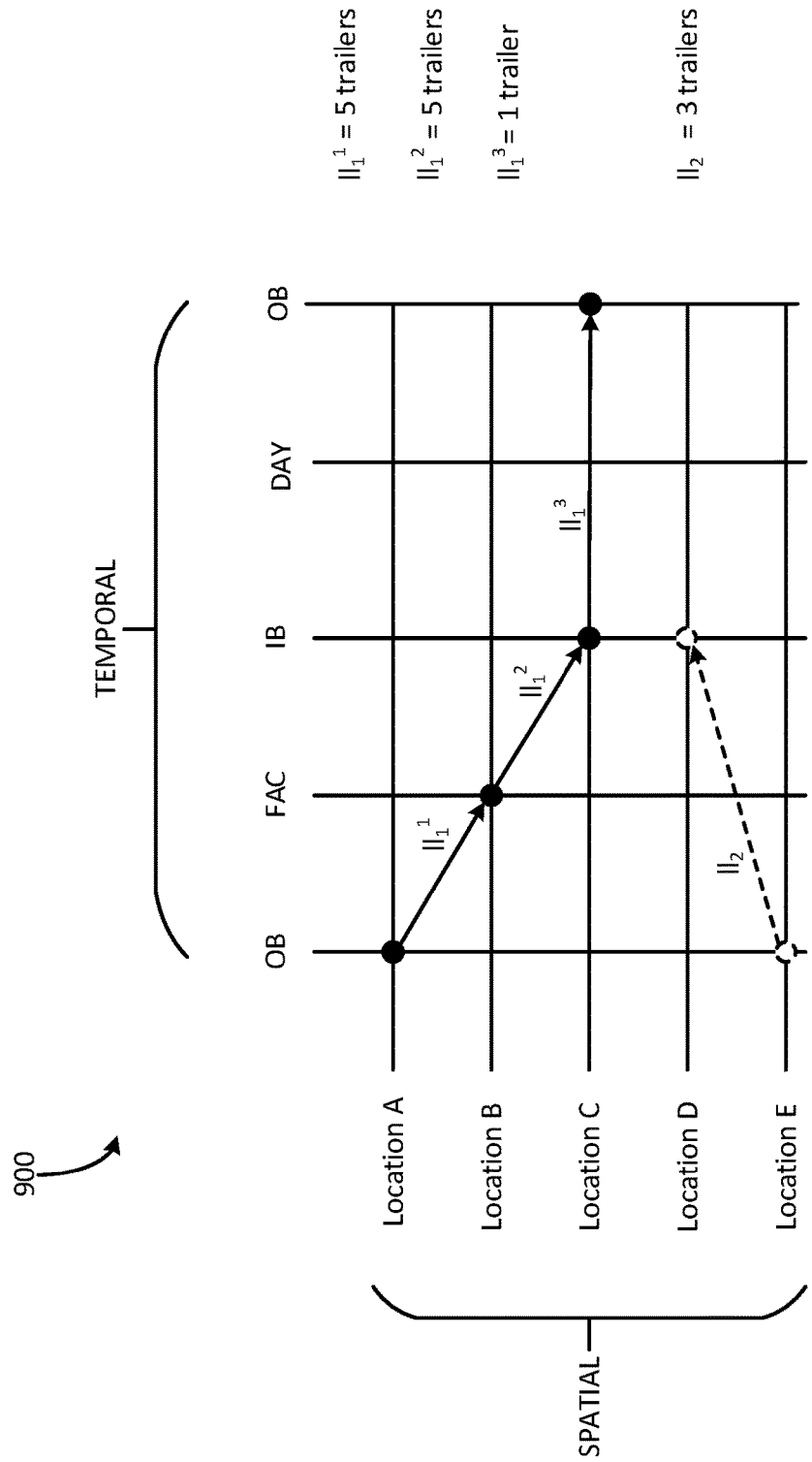
FIG. 9 shows an example of optimal routes including load routes according to some aspects of the present disclosure.

One example of such optimal routes 810 is shown in FIG. 9. In this example, the optimal routes include load routes 900. The load routes 900 correspond to a future time period that spans from a current OB shift at a given set of locations (locations A-E) in the network to the next OB shift at that same set of locations. Between the two OB shifts are three other shifts—an FAC shift, an IB shift, and a DAY shift. As shown, there are two optimal load routes associated with those locations and shifts. The first load route is depicted in a solid line and extends from the outbound shift at Location A to the outbound shift at Location C. It includes three load legs, labeled $ll_1^1$-$ll_1^3$. The second load route is depicted in a dashed line and extends from the outbound shift at Location E to the inbound shift at Location D. It includes one load leg, labeled $ll_2$. As will be described in greater detail later on, the optimization model 808 can also be configured to determine how many trailers are needed on each load leg of each load route over that future time period. For example, the optimization system 804 can determine that $ll_1^1$ will need five trailers, $ll_1^2$ will need five trailers, and $ll_1^3$ will need one trailer. The optimization system 804 can also determine that $ll_2$ will need one trailer.

Figure 10:
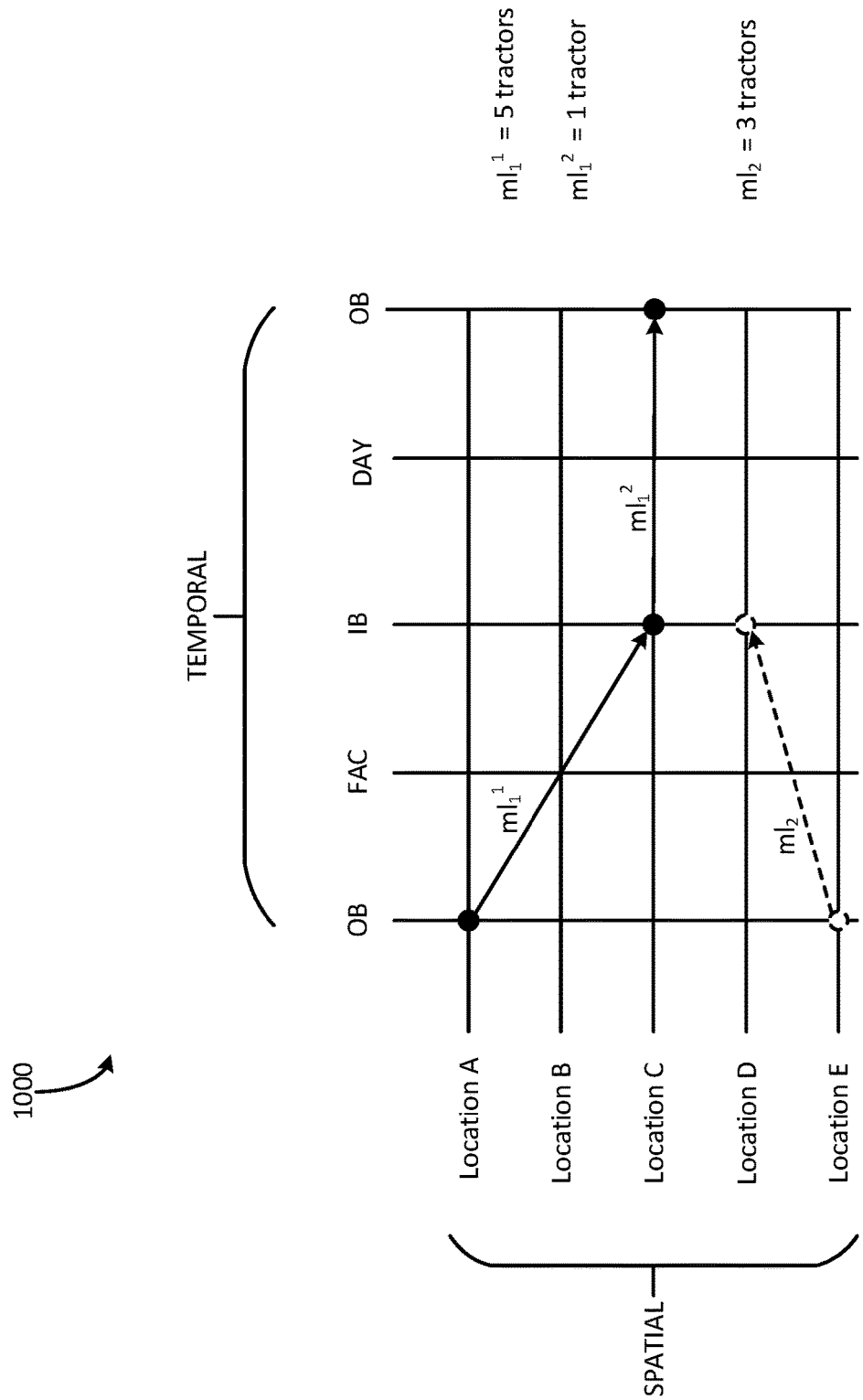
FIG. 10 shows an example of optimal routes including move routes according to some aspects of the present disclosure.

Another example of the optimal routes 810 is shown in FIG. 10. In this example, the optimal routes include move routes 1000. The move routes 1000 correspond to a future time period that spans from a current OB shift at a given set of locations (locations A-E) in the network to the next OB shift at that same set of locations. Between the two OB shifts are three other shifts—an FAC shift, an IB shift, and a DAY shift. As shown, there are two optimal move routes associated with those locations and shifts. The first move route is depicted in a solid line and extends from the outbound shift at Location A to the outbound shift at Location C. It includes two move legs, labeled $ml_1^1$ and $ml_1^2$. The second move route is depicted in a dashed line and extends from the outbound shift at Location E to the inbound shift at Location D. It includes one move leg, labeled $ml_2$. As will be described in greater detail below, the optimization model 808 can also be configured to determine how many tractors (e.g., trucks) are needed on each move leg of each move route over that future time period. For example, the optimization system 804 can determine that $ml_1^1$ will need five tractors and $ml_1^2$ will need one tractor. The optimization system 804 can also determine that $ml_2$ will need three tractors.

Referring back to FIG. 8, the optimization system 804 can periodically update (e.g., re-create) the optimization model 808 and execute the updated optimization model 808 to generate an updated set of optimal routes. For instance, the optimization system 804 can update and execute the optimization model 808 daily to generate an updated set of optimal routes. The optimization system 802 can update the optimization model 808 based on new information that became available during the last cycle (e.g., the previous 24-hour period). For example, the optimization system 804 can generate a new optimization model based on new network state data, new move graph data, new load graph data, and/or other new data that became available in the last cycle. This can help ensure that the optimal routes used to transport the cargo are updated relatively continuously based on changes to the network. Because new cargo enters the network each day and some (but not all) existing cargo leaves the network each day, and cargo moves through the network each day, the network state may be continuously in flux. Thus, an optimal set of routes computed today may not be as optimal tomorrow due to these changes. Periodically updating the optimal set of routes, for example at a daily (or even 20-30 minute time) interval, can help ensure that these changes are taken into account and that cargo transport remains optimized over time.

After determining the optimal routes 810, the optimization system 804 may execute an instruction generator 812. The instruction generator 812 can be configured to generate instructions 814 based on the optimal routes 810. The instructions 814 may be meant for workers (e.g., dock workers, drivers, managers, etc.) in the cargo network. For example, the instruction generator 812 can generate instructions 814 for workers at various locations throughout the network, where the instructions 814 indicate where to store cargo, where to move cargo, how to pack cargo onto trailers, etc. The optimization system 804 can then transmit the instructions 814 to one or more client devices 114a-n associated with the workers, to thereby provide the instructions 814 to the workers. In this way, the system 800 can provide the workers with custom tailored instructions for effectuating their particular subpart of the optimal routes 810.

As one particular example, the optimal routes 810 can indicate that certain cargo should be received at Location A on the IB shift, sent from Location A to Location B on the following OB shift, and received at Location B at the following IB shift. So, the instruction generator 812 can generate a first set of instructions for a first set of workers on the IB shift at Location A. The first set of instructions can indicate that the first set of workers are to receive the cargo, unpack it from its trailers, and move it to a certain outbound dock. The instruction generator 812 can also generate a second set of instructions for a second set of workers on the OB shift at Location A. The second set of instructions can indicate how to pack the cargo onto one or more different trailers for transport to Location B. The instruction generator 812 can further generate a third set of instructions for a third set of workers on the IB shift at Location B. The third set of instructions can indicate that the third set of workers are to receive the cargo and unpack it from the one or more trailers. Thus, the instruction generator 812 can generate multiple different sets of instructions for multiple different workers on multiple different shifts at multiple different locations, to coordinate and facilitate one or more legs of a transport route for the cargo.

Additionally, some examples may allow certain workers to have more visibility into the optimal routes 810 than others. For instance, a first set of workers (e.g., managers) may be able to access a more complete view of the optimal routes 810, while a second set of workers (e.g., dock workers) may only have limited access to information about their particular portion of the optimal routes 810. For instance, the second set of workers may only be able to view information about how a specific piece of cargo associated with their location is to be unpacked from a first trailer and/or packed onto a second trailer. This limited visibility may make it easier and more intuitive for the second set of workers to perform their tasks.

By using the process described above, the system 800 can determine an optimal set of routes 810 for transporting cargo through a network, generate instructions 814 for workers in the cargo network based on the optimal set of routes 810, and provide those instructions 814 to the workers to effectuate the optimal set of routes 810. While normally a process like this may be infeasible or impossible given the large number of possible spaciotemporal routes through a large cargo network, some examples herein make the process practical and fast by dynamically constructing an optimization model (e.g., mixed integer programming (MIP) model) and solving it using a combination of classical MIP algorithms and custom heuristics. Using this approach, the system 800 can provide complete instructions to the entire network for an upcoming group of shifts (e.g., the next four shifts in a 24 hour period) in about 20 minutes. More details about the process will now be described with respect to FIG. 11.

Figure 11:
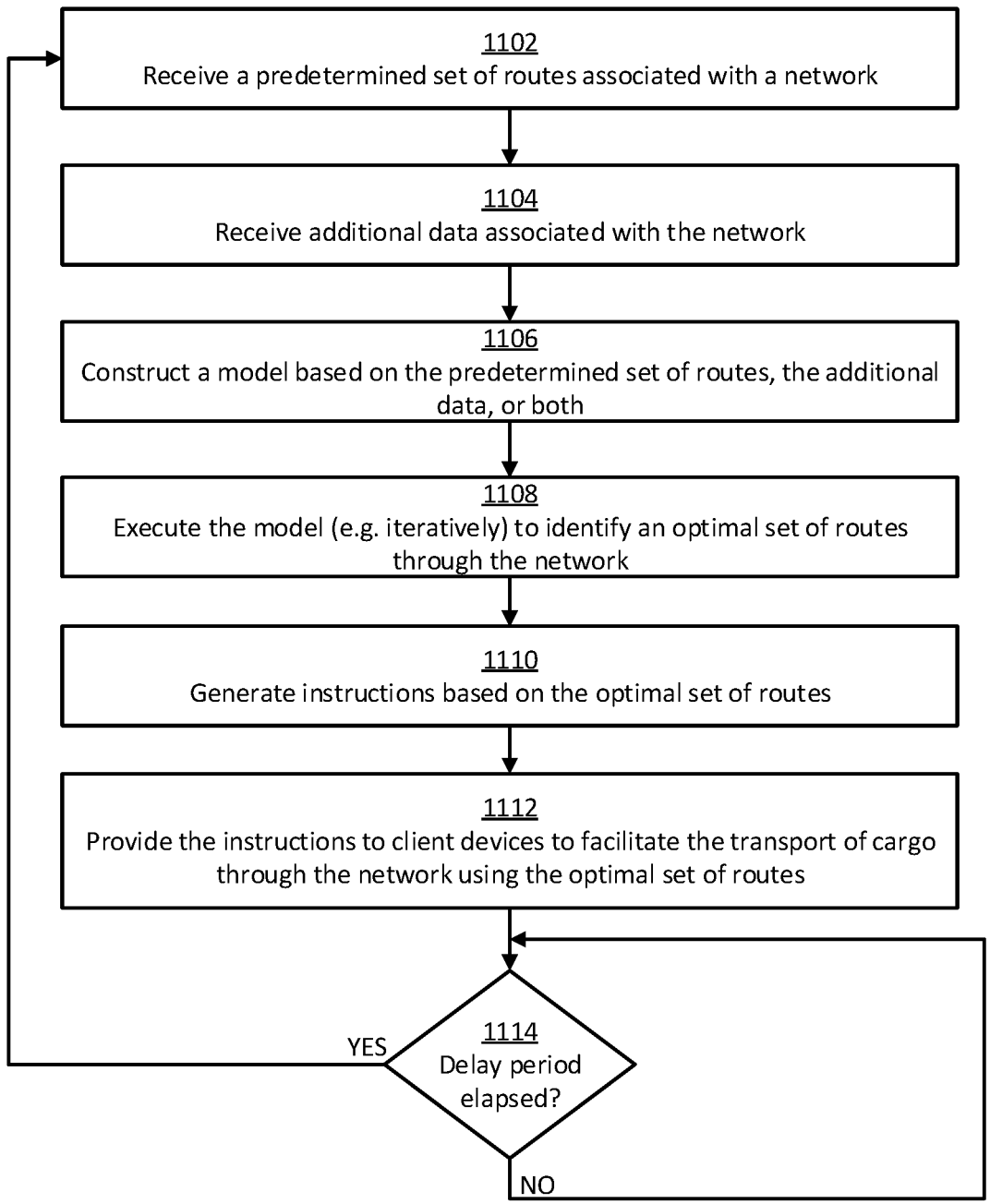
FIG. 11 shows an example of a process for optimizing cargo transport through a network according to some aspects of the present disclosure.

Turning now to FIG. 11, shown is an example of a process for optimizing cargo transport through a network according to some aspects of the present disclosure. Other examples may involve more operations, fewer operations, different operations, or a different sequence of operations than is shown. The operations of FIG. 11 are described below with reference to the components of FIG. 8 above.

In block 1102, an optimization system 804 receives a predetermined set of routes associated with a network. The optimization system 804 can receive the predetermined set of routes from the computer system 130 (e.g., via its API 802a) or another source. In some examples, the predetermined set of routes may include move routes in a move graph 116, load routes in a load graph 118, default routes in a default network graph 108, or any combination thereof.

In some examples, the network may be a cargo transport network. In other examples, the network may be another type of network. For instance, the network may be a computer network and the predetermined set of routes may be routes for packets through the network.

In block 1104, the optimization system 804 receives additional data associated with the network. For instance, the optimization system 804 can receive the network state data 110 and the other data 132. In some examples, the additional data may indicate some or all of the following:
New cargo entering the network (e.g., linehaul network) from pickups for the day;
Existing cargo already in the network and part of the way towards its destination;
The location of the existing cargo in the network, such as whether cargo is currently riding on a trailer, sitting at a dock of a particular service center, or sitting in a trap trailer (at a dock door, or sitting in the parking lot of the service center);
Attributes of the cargo (e.g., shipments) in the network, such as its cubic volume, weight, type (e.g., normal, bulk liquid, hazardous), ultimate origin, current location, ultimate destination, due date, and its delivery status (e.g., early, on time, or late);
Trailers that are in transit and what cargo is on those trailers;
Trailers that are currently sitting at service center docks with at least some cargo onboard;
Trailers that were built prior to running of the current model, are currently sitting at a given service center, and intended to move somewhere else and be unloaded at a different service center and shift;
The number of drivers available to drive a tractor at a given current service center and shift;
The number of highway subservice (HSS) pulls available to leave a given service center and shift, where a HSS is a scheduled run from a starting location and shift to an ending location and shift, sometimes several days in the future; and
The rehandle capacity of each service center on a given shift to rehandle freight.

In block 1106, the optimization system 804 constructs a model (e.g., optimization model 808) based on the predetermined set of routes and/or the additional data. The model can be expressed as a series of constraints, variables, and an objective function.

In some examples, the model can be a minimum cost multicommodity flow model through a capacitated time space network. It can be considered a multicommodity flow model because:
There are multiple Origin-Destination (OD) combinations that are separately tracked and must flow across their own unique set of feasible load paths (e.g., there is 1 default load path and N diversionary or alternate load paths);
Their total flow across all feasible paths is equal to their total cube/weight; and
Different OD pairs will share load legs and move legs.
In general, ODs may flow across multiple load paths, where load paths are composed of load legs, some of which are shared across the different load paths of different ODs. In this context, trailers can only flow across load legs if the corresponding tractors are assigned to one of the underlying move paths that support the load legs. And because tractors and trailers can only be assigned in integer quantities (there cannot be a fraction of a tractor or trailer), the problem can be considered combinatorial, which would normally make it very difficult to solve.

In order to solve this problem in a tractable amount of time (e.g., less than 20-25 minutes), some examples solve the model iteratively by using a combination of classical MIP algorithms (e.g., branch and bound, "Gomory" cuts, other cuts, aggregation approaches, etc.) and decomposition heuristics (e.g., solve first for diversions, and then fix the diversions and solve for the vias). The combination of these two leads to good close-to-optimal solutions in a reasonable amount of time. Without the decomposition heuristics, no solution may be possible in a reasonable amount of time, and, in fact, may not be possible even with years of computing time on the most powerful super computers today, given the difficultly of this kind of combinatorial optimization problem.

The model can include variables and constraints with values that can be computed based on the predetermined set of routes and/or the additional data. Some examples of those variables and constraints are as follows:
For each origin-destination pair (OD), derive the set of feasible Load Paths $LP=LP_{od}=\{lp|lp$ is a feasible sequence of load legs, $(ll)_{lp}$, going from origin/originShift/originDay to destination/destShift/destDay$\}$.
$fraction_{lp}^{od}$=fraction (0,1) of OD flowing down load path=lp
$\Sigma_{lp} fraction_{lp}^{od}$=1.0 for all OD. The total OD cube/weight must flow across all chosen load paths. If a portion of the OD is culled, that portion is assigned to a hold load path.
$weight_{lp}^{od}=fraction_{lp}^{od}*weight^{od}$ for all OD an lp in $LP_{od}$
$cube_{lp}^{od}=fraction_{lp}^{od}*cube^{od}$ for all OD an lp in $LP_{od}$
The above operations can involve grouping together cargo based on their ODs, so that cargo with the same or similar ODs are grouped together. For a given OD group, the corresponding cargo will traverse along one or more load paths. For example, the cargo in a given OD group may traverse four different load paths, with different amounts (fractions) of the cargo in the OD group passing along the four different load paths. For instance, 20% of the cargo in the OD group may pass along a first load path, 40% of the cargo in the OD group may pass along a second load path, 10% of the cargo in the OD group may pass along a third load path, and 30% of the cargo in the OD group may pass along a fourth load path. The weight of the cargo from the OD group that will traverse a given load path is then determined by multiplying the fractional amount of the OD group that traverses the load path by the total weight for the OD group. Similarly, the cubic area ("cube") of the cargo from the OD group along a given load path is determined by multiplying the fractional amount of the OD group that traverses the load path by the total cubic area encompassed by the OD group. This can be repeated for all load paths associated with all ODs.

Additional examples of variables and constraints that can be derived for the model include the following:

For each Load Leg, ll, we can derive the set of OD,LP combinations that flow across the given ll=ODLP$_{ll}$={(od, lp)|lp in LP$_{od}$ and ll is in the feasible sequence of load legs comprising lp}.

numPups$_{ll}$ for all ll in set of all Load Legs $$\sum_{odlp\_LL} \text{weight}_{lp}^{od} \leq \frac{\text{pounds}}{\text{pup}} * numPups_{ll}$$

for all ll in a set of all Load Legs.

$$\sum_{odlp\_LL} \text{cube}_{lp}^{od} \leq \frac{\text{cube}}{\text{pup}} * numPups_{ll}$$

for all ll in a set of all Load Legs.

Total number of trailers (e.g., "pups") flowing on load leg ll: numPups$_{ll}$

The above constraints can help determine how many trailers are needed for each load leg, assuming that the amount of weight that can be carried by each trailer (pounds/pup) and the cubic area of storage space in each trailer (cube/pup) are known quantities. In particular, each load path can include a series of load legs. And in the previous operations, the total weight and total cubic area of cargo along each load path was determined. Thus, the weight and cubic area along each individual load leg can also be determined.

Additional examples of variables and constraints that can be derived for the model include the following:

For each Load leg, ll, it can be moved along a set of possible move paths=MP$_{ll}$={mp|mp is a feasible sequence of move legs, (ml)$_{mp}$, going from the beginning origin/originShift/originDay of the Load Leg to its tail at dest/destShift/dest Day}.

Total number of trailers flowing on load leg ll across move path mp: numPups$_{ll}$, mp numPups$_{ll}$=$\sum_{mp\ in\ MP_{ll}}$ numPups$_{ll}$, mp The above constraints can help correlate the load legs and trailers to move paths. In particular, the number of trailers associated with a given load leg can also be associated with one or more move paths that contain the load leg. Thus, the relationships between load legs, move paths, and trailers can be determined.

Additional examples of variables and constraints that can be derived for the model include the following:

For each move leg, ml, we can derive the set of LL,MP combinations that flow across the given ml=LLMP$_{ml}$={(ll, mp)|mp in MP$_{ll}$ and ml is in the feasible sequence of move legs comprising mp}.

numTractors$_{ml}$ for all ml in set of all Move Legs $\sum_{\{LLMP_{ml}\}}$numPups$_{ll,mp}$<=(numPups/moveLeg) _ml*numTractors$_{\{ml\}}$ for all ml Note that numPups/moveleg is typically 2 or 3 depending on whether the move leg is doubles/triples. That is, for any given move leg, a tractor may only be allowed (e.g., legally) to pull either 2 or 3 trailers at a time. More trailers may be forbidden for safety reasons or other reasons.

For each load leg ll across move path mp: numPups$_{ll}$, mp, these pups can be moved not only by the ml in mp, but by "helping" move legs such as vias.

For each move leg, ml (e.g., going from OB→FAC), we can require that the number of tractors going out equals the number coming "home" on the IB. That way, the number of tractors leaving a location is equal to the number of tractors returning to that location, which helps the network remain balanced so that tractors and trailers do not begin to collect in a limited number of locations.

The above constraints can help determine how many tractors will be needed for each move leg. In particular, each move path can include a series of move legs. And in the previous operations, the number of trailers on each move path was determined. Thus, the number of trailers on each individual move leg can also be determined.

Additional examples of variables and constraints that can be derived for the model include the following:

For each location (e.g., "sic"), we have a number of drivers that are available to transport cargo. This number may be known and can be referred to as DSRCount$_{sic}$. For example, on any given day, there may be a known number of drivers that are available to transport cargo in the network.

$\sum_{\{ml|origin,\ originshift\ of\ ml\ is\ sic/OB\}}$(numDrivers/ml) *numTractors$_{ml}$≤DSRCount$_{sic}$ for all sic numDrivers/ml=2 for certain lanes, and 1 otherwise.

The above constraints can limit the number of tractors based on the number of drivers available in the network, since the number of tractors that can actually be used depends on the number of drivers available to drive them.

There can also be additional factors that can be taken into consideration by the model. Some examples of these additional factors can include the following:

Double turns. This is when a tractor goes from Location A on the OB shift to Location B on the FAC shift, and the distance from A→B is small enough that the tractor can repeat this move at least twice during the OB→FAC time span.

The number of available HSS tractors and the ability to repoint (within a certain radius of the original destination), add, or subtract HSS tractors. This accounts for the fact that there may be the option to (e.g., for a price) change the destination of a prescheduled HSS run for this evening.

Constraints on increasing loading cube/weight out of tomorrow's OB by more than a fraction of what would load by default.

Constraints on increasing loading cube/weight out of tomorrow's IB by more than a fraction of default (for selected IB sites).

Phantom drivers. In some situations, there may not be enough drivers available in the network to move all of the cargo, so the DSRcount variable may be too low a value. To solve this problem, "phantom" drivers can be created. The phantom drivers are artificial (fake) drivers that can be used in the model at a very high cost (e.g., penalized to minimize their use to only what is necessary to move the freight). Because of their high cost, the model may try to use its other tools, such as vias and diversions, to avoid needing phantom drivers. The model can generate such phantom drivers, if necessary, to help achieve feasibility. Then, the need for these phantom drivers can be communicated to the linehaul coordinators, who can determine how to account for the phantom drivers (e.g., by calling in additional workers on their day off or otherwise intervening to try to move the cargo).

There can be limits on what routes can be covered by phantom drivers, which can help ensure that phantom drivers are not used in inappropriate ways, such as for vias.

Pre-loaded LH trailers (e.g., LDDK or Closed). Pre-loaded trailers should be respected to avoid having to unload cargo from vans that are already at least partially built.

Pre-loaded Bypass/Closed/LDDK trailers should be respected.

Culling of freight. This can be calculated dynamically (e.g., on the fly) to respect shipment cullability and extent of culling.

In block 1108, the optimization system 804 executes the model to identify an optimal set of routes 810 through the network. Each such route can include a starting location, starting shift, and starting day at which the route originates, an ending location, ending shift, and ending day at which the route ends, a number of tractors and trailers that will drive on each leg (e.g., load leg and move leg) along the route, the composition of the trailers (e.g., what cargo should be on each trailer), etc.

As noted above, in some examples, the model may be executed iteratively to identify the optimal set of routes 810. For instance, the model can be a Mixed Integer Program (MIP) that is complicated and combinatorial enough that it is not solvable for an LTL network (e.g., with 300+ service centers, 50+ FACs, 100K+ shipments per day, 30K+ unique OD combinations day, 10K+ drivers/tractors, etc.) by classical MIP algorithms in a feasible amount of time. In fact, trying to solve such a complex model directly using current commercial solvers and the most powerful servers commercially available may result in no feasible solution, even if the model is run for weeks on end. In these situations, the model may simply be intractable without special custom heuristics and decomposition approaches. Thus, some examples described herein can apply the following iterative/decomposition approach to help solve this problem:

1. Fix vias and diversions to 0.
   a. First solve for no vias and no diversions to produce a good starting solution.
2. Fix vias to 0 and solve the resulting diversions subproblem.
   a. Keep vias turned off but activate diversions. With diversions activated, there are now many possible load paths per OD in the problem.
   b. Solve this problem. This can be a difficult and large problem (e.g., hundreds-of-thousands of variables and constraints), but not intractable problem. In some cases, this problem can be solved in about 10 minutes, if we start from an advanced solution generated by step 1.
3. Fix the diversions from the first subproblem and enable vias (e.g., to further reduce tractor mileage). This problem, though also large and difficult, is nonetheless tractable. In some cases, this problem can be solved on advanced computers in roughly 5 minutes.
4. Post-process the solution (e.g., the optimal set of routes 810).

In block 1110, the optimization system 804 generates instructions 814 based on the optimal set of routes 810. The optimization system 804 can use the instruction generator 812, which may apply a predefined set of rules, to generate the instructions 814. The instructions 814 can be intended for workers at various locations (e.g., service centers and FACs) throughout the network. For example, the instructions 814 can be customized for hundreds of service centers and designed to be executed in the field by service center personnel.

In block 1112, the optimization system 804 provides the instructions 814 to client devices 114*a-n* to facilitate the transport of cargo through the network in accordance with the optimal routes 810. The client devices 114*a-n* can be associated with different service centers or workers (e.g., service center personnel) that participate in the transport of the cargo through the network.

In block 1114, the optimization system 804 determines whether a delay period has elapsed. The delay period can be a time period between successive updates to the optimal routes 810. Examples of the delay period may be one hour, three hours, six hours, 12 hours, or one day. If the delay period has elapsed, the process can return to block 1102 and iterate to produce an updated set of optimal routes. Otherwise, the optimization system 804 can continue to wait until the delay period has elapsed.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations thereof in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. A non-transitory computer-readable medium comprising program code that is executable by one or more processors to cause the one or more processors to:

receive a predetermined set of routes for moving cargo through a network;

construct a model based on the predetermined set of routes, wherein the model includes a predefined objective function and one or more constraints, and wherein the model defines a combinatorial optimization problem that is solvable to identify an optimal set of routes from the predetermined set of routes that most closely satisfies the predefined objective function subject to the one or more constraints;

execute an iterative process using the model to solve the combinatorial optimization problem and thereby determine the optimal set of routes through the network, wherein executing the iterative process includes:

executing a first iteration of the model in which vias and diversions in the predetermined set of routes are ignored, to identify an initial set of routes from the predetermined set of routes that excludes the vias and the diversions;

executing a second iteration of the model in which the vias are ignored and the diversions are allowed, and starting from the initial set of routes, to determine an intermediate set of routes that excludes the vias; and executing a third iteration of the model in which the vias are allowed, and starting from the intermediate set of routes, to determine the optimal set of routes; and provide, to a client device, instructions generated based on the optimal set of routes for use in facilitating transport of the cargo through the network in accordance with the optimal set of routes.

2. The non-transitory computer-readable medium of claim 1, wherein the optimal set of routes includes a set of load legs, and wherein the model is configured to determine a respective number of trailers to assign to each load leg in the set of load legs.

3. The non-transitory computer-readable medium of claim 1, wherein the optimal set of routes includes a set of move legs, and wherein the model is configured to determine a respective number of tractors to assign to each move leg in the set of move legs.

4. The non-transitory computer-readable medium of claim 1, wherein the optimal set of routes indicate cargo movements over a predefined future timespan.

5. The non-transitory computer-readable medium of claim 1, wherein the predetermined set of routes includes a set of move routes comprising default move routes and alternative move routes, the alternative move routes being derived from and different than the default move routes.

6. The non-transitory computer-readable medium of claim 5, wherein the predetermined set of routes includes a set of load routes comprising default load routes and alternative load routes, the alternative load routes being derived from and different from the default load routes.

7. The non-transitory computer-readable medium of claim 1, wherein each route in the optimal set of routes begins at a starting location and starting shift and ends at an end location and an end shift.

8. The non-transitory computer-readable medium of claim 1, further comprising program code that is executable by the one or more processors to cause the one or more processors to, after constructing the model:

receive updated network-state data from one or more sources, the updated network-state data indicating an updated state of the network;

update the model based on the updated network-state data, to thereby generate an updated model; and re-execute the iterative process using the updated model to identify an updated set of optimal routes.

9. The non-transitory computer-readable medium of claim 1, wherein the model includes a multicommodity flow model.

10. A method comprising:

receiving, by one or more processors, a predetermined set of routes for moving cargo through a network;

constructing, by the one or more processors, a model based on the predetermined set of routes, wherein the model includes a predefined objective function and one or more constraints, and wherein the model defines a combinatorial optimization problem that is solvable to identify an optimal set of routes from the predetermined set of routes that most closely satisfies the predefined objective function subject to the one or more constraints;

executing, by the one or more processors, an iterative process using the model to solve the combinatorial optimization problem and thereby determine the optimal set of routes through the network, wherein executing the iterative process includes:

executing a first iteration of the model in which vias and diversions in the predetermined set of routes are ignored, to identify an initial set of routes from the predetermined set of routes that excludes the vias and the diversions;

executing a second iteration of the model in which the vias are ignored and the diversions are allowed, and starting from the initial set of routes, to determine an intermediate set of routes that excludes the vias; and executing a third iteration of the model in which the vias are allowed, and starting from the intermediate set of routes, to determine the optimal set of routes; and providing, by the one or more processors and to a client device, instructions generated based on the optimal set of routes for use in facilitating transport of the cargo through the network in accordance with the optimal set of routes.

11. The method of claim 10, wherein the optimal set of routes includes a set of load legs, and wherein the model is configured to determine a respective number of trailers to assign to each load leg in the set of load legs.

12. The method of claim 10, wherein the optimal set of routes includes a set of move legs, and wherein the model is configured to determine a respective number of tractors to assign to each move leg in the set of move legs.

13. The method of claim 10, wherein the optimal set of routes indicate cargo movements over a predefined future timespan.

14. The method of claim 10, wherein the predetermined set of routes includes a set of move routes comprising default move routes and alternative move routes, the alternative move routes being derived from and different than the default move routes.

15. The method of claim 10, wherein the predetermined set of routes includes a set of load routes comprising default load routes and alternative load routes, the alternative load routes being derived from and different from the default load routes.

16. The method of claim 10, wherein each route in the optimal set of routes begins at a starting location and starting shift and ends at an end location and an end shift.

17. The method of claim 10, further comprising, after constructing the model:

receiving updated network-state data from one or more sources, the updated network-state data indicating an updated state of the network;

updating the model based on the updated network-state data, to thereby generate an updated model; and re-executing the iterative process using the updated model to identify an updated set of optimal routes.

18. The method of claim 10, wherein the model includes a multicommodity flow model.

19. A system comprising:

one or more processors; and one or more memories including program code that is executable by the one or more processors to cause the one or more processors to:

receive a predetermined set of routes for moving cargo through a network;

construct a model based on the predetermined set of routes, wherein the model includes a predefined objective function and one or more constraints, and wherein the model defines a combinatorial optimization problem that is solvable to identify an optimal set of routes from the predetermined set of routes that most closely satisfies the predefined objective function subject to the one or more constraints;

execute an iterative process using the model to solve the combinatorial optimization problem and thereby determine the optimal set of routes through the network, wherein executing the iterative process includes:

executing a first iteration of the model in which vias and diversions in the predetermined set of routes are ignored, to identify an initial set of routes from the predetermined set of routes that excludes the vias and the diversions;

executing a second iteration of the model in which the vias are ignored and the diversions are allowed, and starting from the initial set of routes, to determine an intermediate set of routes that excludes the vias; and executing a third iteration of the model in which the vias are allowed, and starting from the intermediate set of routes, to determine the optimal set of routes; and provide, to a client device, instructions generated based on the optimal set of routes for use in facilitating transport of the cargo through the network in accordance with the optimal set of routes.

20. The system of claim 19, wherein the one or more memories further comprise program code that is executable by the one or more processors to cause the one or more processors to:

generate the instructions based on the optimal set of routes, the instructions including a first set of instructions and a second set of instructions, the second set of instructions being different than the first set of instructions; and transmit the first set of instructions to a first client device and the second set of instructions to a second client device, wherein the first client device and the second client device are associated with locations in the network.

* * * * *